United States Patent
Li et al.

(10) Patent No.: US 10,466,481 B2
(45) Date of Patent: Nov. 5, 2019

(54) ELECTRONIC DEVICE

(71) Applicant: Lenovo (Beijing) Co., Ltd., Beijing (CN)

(72) Inventors: Jianguo Li, Beijing (CN); Xiangbo Lv, Beijing (CN); Xiaobin Liang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/648,998

(22) Filed: Jul. 13, 2017

(65) Prior Publication Data

US 2018/0017795 A1    Jan. 18, 2018

(30) Foreign Application Priority Data

Jul. 14, 2016 (CN) .......................... 2016 1 0556126
Dec. 16, 2016 (CN) .......................... 2016 1 1169595

(51) Int. Cl.
G02B 27/01 (2006.01)
G02B 27/00 (2006.01)
(Continued)

(52) U.S. Cl.
CPC ......... *G02B 27/0172* (2013.01); *G02B 6/003* (2013.01); *G02B 6/0055* (2013.01);
(Continued)

(58) Field of Classification Search
CPC ...... G03B 21/14; G03B 21/142; G03B 21/28; G06F 1/163; B60K 35/00; B60K 2350/1072; B60K 2350/203; B60K 2350/2052; B60K 2350/2056; B60K 2350/921; G02B 27/0081; G02B 27/0012; G02B 27/01; G02B 27/0101; G02B 27/0172; G02B 27/0169; G02B 27/0159; G02B 27/0176; G02B 27/017; G02B 27/0179; G02B 27/022; G02B 27/1073; G02B 27/108; G02B 27/145; G02B 27/148; G02B 27/28; G02B 27/4205; G02B 27/4227; G02B 27/4272; G02B 2027/011;
(Continued)

(56) References Cited

U.S. PATENT DOCUMENTS 5,754,900 A * 5/1998 Suda ...................... G03B 17/20
                                                    396/296
6,204,974 B1 * 3/2001 Spitzer ................. G02B 27/017
                                                    359/630

(Continued)

FOREIGN PATENT DOCUMENTS

CN        101915992 A      12/2010
CN        103261943 A       8/2013
(Continued)

*Primary Examiner* — Wen Huang
(74) *Attorney, Agent, or Firm* — Anova Law Group, PLLC (57) ABSTRACT

The present disclosure provides an electronic device including a device body being maintained at a preset position relative to an eye of a user. The device body further includes: a display unit for emitting light corresponding to a display content; and a lens group having a side surface facing the display unit. The light emitted from the display unit is reflected by the side surface to be incident on the eye of the user.

17 Claims, 9 Drawing Sheets

(51) Int. Cl.
  *G02B 27/02* (2006.01)
  *G02B 27/10* (2006.01)
  *G02B 27/14* (2006.01)
  *F21V 8/00* (2006.01)
  *G02B 6/00* (2006.01)
  *G02B 5/30* (2006.01)
  *G02B 6/06* (2006.01)

(52) U.S. Cl.
  CPC ....... *G02B 27/0081* (2013.01); *G02B 27/022* (2013.01); *G02B 27/108* (2013.01); *G02B 27/1073* (2013.01); *G02B 27/145* (2013.01); *G02B 27/148* (2013.01); *G02B 5/30* (2013.01); *G02B 6/0028* (2013.01); *G02B 6/06* (2013.01); *G02B 2006/0098* (2013.01); *G02B 2027/013* (2013.01); *G02B 2027/0123* (2013.01); *G02B 2027/0125* (2013.01); *G02B 2027/0132* (2013.01); *G02B 2027/0134* (2013.01); *G02B 2027/0178* (2013.01)

(58) Field of Classification Search
  CPC .... G02B 2027/0118; G02B 2027/0125; G02B 2027/0132; G02B 2027/0123; G02B 2027/013; G02B 2027/0178; G02B 3/00; G02B 5/30; G02B 5/3016; G02B 5/1842; G02B 6/0028; G02B 6/003; G02B 6/0055; G02B 2006/0098; G02B 6/06; G02B 27/0134
  USPC ..... 359/618, 630–633; 345/7–9; 351/41, 50, 351/158, 205, 211
  See application file for complete search history.

(56) References Cited

U.S. PATENT DOCUMENTS

| | | | |
|---|---|---|---|
| 6,266,194 B1* | 7/2001 | Tanijiri | G02B 27/0172 359/630 |
| 9,726,888 B2* | 8/2017 | Giartosio | G02B 27/0172 |
| 9,897,886 B2* | 2/2018 | MacK | G02F 1/15 |
| 9,977,245 B2* | 5/2018 | MacK | G06F 3/147 |
| 2017/0261749 A1* | 9/2017 | Briand | G02B 27/0176 |
| 2018/0045964 A1* | 2/2018 | Jones | G02B 27/0172 |

FOREIGN PATENT DOCUMENTS

| | | |
|---|---|---|
| CN | 203433193 U | 2/2014 |
| CN | 204439938 U | 7/2015 |
| CN | 105629479 A | 6/2016 |
| KR | 1020090050816 A | 5/2009 |

\* cited by examiner

ELECTRONIC DEVICE

CROSS-REFERENCES TO RELATED APPLICATIONS

This application claims the priority of Chinese Patent Application No. 201610556126.6, entitled "an electronic device," filed with State Intellectual Property Office of P. R. China on Jul. 14, 2016, and Chinese Patent Application No. 201611169595.9, entitled "a display apparatus and a wearable electronic device," filed with State Intellectual Property Office of P. R. China on Dec. 16, 2016, the entire contents of both of which are incorporated herein by reference.

FIELD OF THE DISCLOSURE

The present disclosure relates to the field of electronic technologies and, more particularly, relates to an electronic device.

BACKGROUND

With continuous progress of science and technology, electronic technology has seen rapidly developed. Many electronic devices have become necessities in people's lives, such as laptops, smart phones, etc. To enhance display effects of virtual scenes, augmented reality devices have come into being.

Electronic devices in the prior art have technical problems such as small viewing angle and large device size. The disclosed method and system are directed to solve one or more problems set forth above and other problems.

BRIEF SUMMARY OF THE DISCLOSURE

One aspect of the present disclosure provides an electronic device, including a device body maintained at a preset position relative to an eye of a user. The device body further includes: a display unit for emitting light corresponding to a display content; and a lens group having a side surface facing the display unit. The light emitted from the display unit is reflected by the side surface to be incident on the eye of the user.

Another aspect of the present disclosure provides an electronic device, including: a display unit for emitting light corresponding to a display content; and a lens disposed at a preset distance from the display unit and at a preset position relative to an eye of a user, the lens having a side surface facing the display unit. The light emitted from the display unit is reflected by the side surface of the lens to be incident on the eye of the user.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. When there is no conflict, the disclosed embodiments and the technical features of the embodiments may be combined with each other.

In a first scenario, a display device may transmit a picture to a glass plate in front of human eyes based on optical waveguide technology; the picture may be then reflected to the eyes to form a virtual image with a certain angle of view. However, in this scenario, light needs to propagate in the glass plate by total reflection. Due to the basic principle of total reflection, limitation of this type of display devices includes inability to support large viewing angles. Further, fragility of the glass plate restricts this type of devices from adapting to complex environments.

In a second scenario, a display device may directs light of an image to a polarized prism, transmission of the light takes place in the polarized prism, and the light may be then reflected to the human eye, thereby forming a virtual image. In this scenario, the display devices need to enlarge reflection surface for widening the view field, which leads to increased size and weight of the prism. Further, real scenes behind the prism at the prism boundaries cannot be seen clearly.

Embodiments of the present disclosure provide an electronic device for addressing the technical problems that an electronic device of the prior art has a small viewing angle and a relatively large size, and for achieving increased viewing angle and reduced size of the entire system.

Requirements for an augmented reality display device often include: enabling users to, after wearing the device, view virtual scenes generated by the computer as well as external real environment; achieving a large viewing angle and high resolution of the virtual display; and making the entire device light and convenient, without obstructions to view real environment or adverse effects on human perception. In an exemplary embodiment, the present disclosure provides an electronic device, including: a fixation structure; and a device body connected with the fixation structure. The device body may maintain a preset positional relationship with an eye of a user by using the fixation structure (e.g., a frame).

The device body may include: a display unit, including an exit surface that emits light; and a lens group, including a side surface facing the display unit, the side surface reflecting the light emergent from the exit surface of the display unit to a user's eye. The side surface, as used herein, refer to the surface of the lens group that faces the display unit if not otherwise specified. The side surface, as used herein, may also be referred as inner side surface.

In some embodiments, the exit surface may be convex towards the lens group. As the device body maintains the preset positional relationship with the eye, the light emitted from the exit surface reaches the inner side surface, and is reflected by the inner side surface to enter the user's eye, thereby making contents presented by the display unit visible to the user. Alternatively, the exit surface of the display unit may have other proper shape, such as a plane or an irregularly-shaped surface.

In the exemplary embodiment, the exit surface is convex towards the lens group, which can increase an exit angle of a light ray and achieve greater angle of view of the electronic device. Further, the electronic device is simply structured with the display unit and the lens group without configuring a prism or a glass as used in the prior art, thereby greatly reducing an overall size. Accordingly, the disclosed electronic device effectively addresses the technical problems of small viewing angles and relatively large sizes for electronic devices in the prior art, and achieves increased viewing angle and reduced size of the entire device.

Embodiment 1

Figure 1:
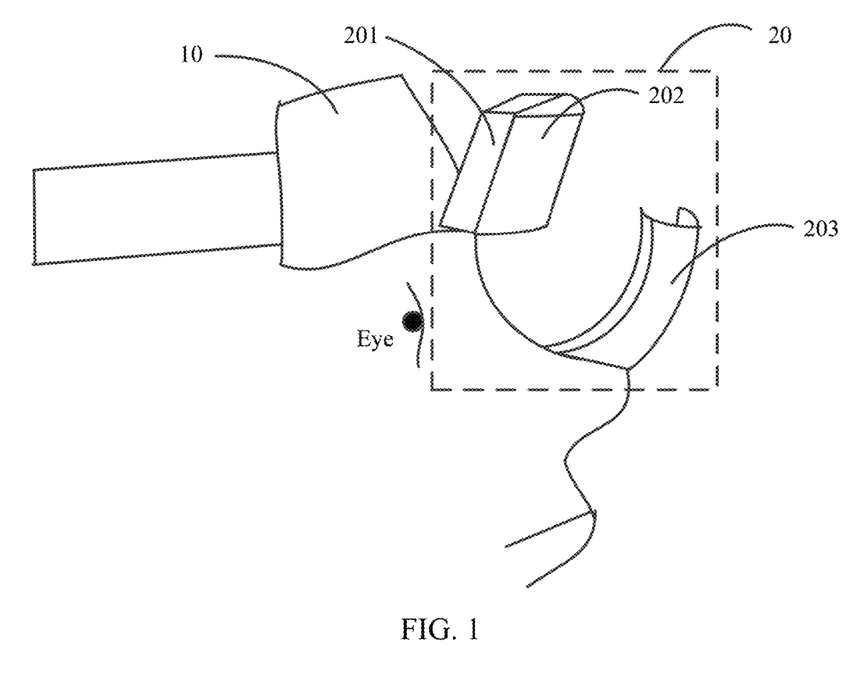
FIG. 1 is a structural diagram of an exemplary electronic device consistent with the disclosed embodiments.

FIG. 1 is a structural diagram of an exemplary electronic device consistent with the disclosed embodiments. The exemplary electronic device may include: a fixation structure 10; and a device body 20 connected with the fixation structure 10. By using the fixation structure, the device body 10 may be attached to a user's head, and maintain a preset positional relationship with an eye of the user. For example, the fixation structure 10 may be a strap or a frame that holds the device body 20 in front of the eye and above the nose. The electronic device may have a form of a headset or eye glasses. If the user is wearing the electronic device properly, the device body 20 is at a preset position relative to an eye of the user. In some embodiments, the user may adjust the fixation structure 10 so that the device body 20 is at a desired position for the user to see the displayed contents clearly.

The device body 20 may further include a display unit and a lens group 203.

The display unit may include a display screen 201 and a light guide panel 202. The light guide panel 202 is disposed in front of a light-emitting surface of the display screen 201. An exit surface of the display unit is the exit surface of the light guide panel. As used herein, the exit surface, if not otherwise specified, refer to the surface where the light leaves the display unit (e.g., the surface of the light guide panel facing the lens group). When a user is wearing the electronic device on the head, a front direction may refer to a same direction as a forward direction from the eyes.

The lens group 203 may be disposed in front of the light guide panel 202, and a light transmittance of the lens group 203 may be greater than a preset threshold.

A user may wear the electronic device on the head using the fixation structure, and the device body is maintained at a preset positional relationship with an eye of the user. As the display screen 201 displays certain content, an incident light emitted from the light-emitting surface of the display screen 201 may enter the incident surface of the light guide panel, and leave the exit surface of the light guide panel opposite to the incident surface. The light may be further transmitted to reach the inner-side surface of the lens group 203, and by the reflection on the inner-side surface, at least a part of the transmitted light may enter the eye of the user. Accordingly, the displayed content become visible to the user.

By disposing the light guide panel 202 in front of the display screen 201, the light emitted from the display screen 201 is transmitted through the light guide panel 202, an image face resembling a shape of the exit surface is generated on the exit surface of the light guide panel 202. In the case that the exit surface is curved, a curved image face is generated on the exit surface, thereby changing the exit position of the light relative to the display screen 201, increasing the exit angle and expanding the viewing angle of the electronic device.

The electronic device is simply structured with the display screen 201, the light guide panel 202, and the lens group 203, without configuring a prism or a glass used in the prior art, thereby greatly reducing an overall size of the electronic device. Accordingly, the disclosed electronic device effectively addresses the technical problems of small viewing angles and relatively large sizes for electronic devices in the prior art, and achieves increased viewing angle and reduced size of the entire device.

The disclosed electronic device may be an augmented reality display device. Alternatively, the disclosed electronic device may be a regular wearable display device. Using augmented reality display device as an example, embodiments are provided to describe the structure of the disclosed electronic device in detail.

The fixation structure 10 may be made of engineering plastics, elastomeric materials, or a combination thereof. The engineering plastics may be polycarbonates, polyamides, etc. The elastomeric materials may be loose cord, wide nylon rope, etc.

The fixation structure 10 and the device body 20 may use different connection modes.

In one example, both ends of the device body 20 may be connected to the fixation structure 10, making the fixation structure 10 as a part of an annular or approximate annular shape. The fixation structure 10 may be an integral piece, or divided in two parts.

In another example, the fixation structure 10 may have an annular or approximately annular shape by itself. The device body 10 may be disposed on an outer surface of the annular or approximately annular structure, establishing a face contact connection between the fixation structure 10 and the device body 20.

Figure 2:
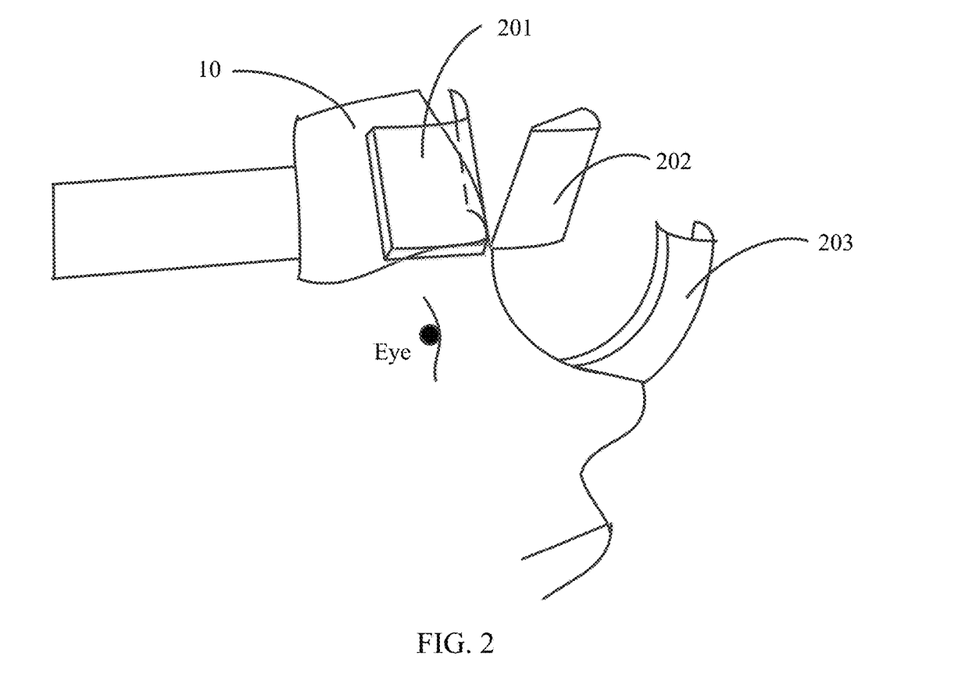
FIG. 2 is a structural diagram of another exemplary electronic device consistent with the disclosed embodiments.

In an exemplary embodiment, the device body 20 may include the display screen 201, the light guide panel 202, and the lens group 203. The display screen 201 may present content that augments the reality, such as image, text, video, etc. The display screen 201 may be an LCD (Liquid Crystal Display), an OLED (Organic Light-Emitting Diode) display, a micro display, etc. The type of display is not limited in the present disclosure. The display screen 201 may include a plane surface as shown in FIG. 1 or a curved surface as shown in FIG. 2. The curved surface may have a similar curvature as the user's head. Practical situations may be evaluated to configure a desired surface type.

Figure 3:
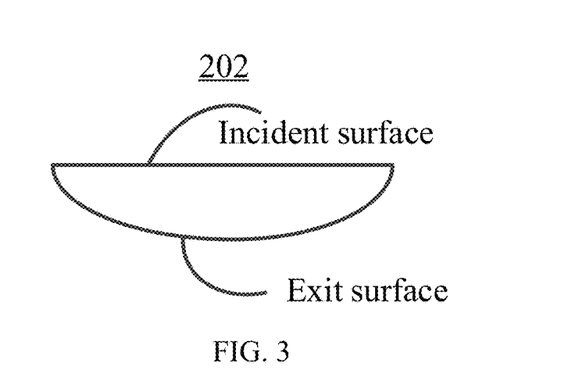
FIG. 3 is a cross-sectional view of an exemplary light guide panel consistent with the disclosed embodiments.

In an exemplary embodiment, the light guide panel 202 may be made of optical fibers, or acrylic/PC sheet with light guide spots/dots inside. The light guide spots may have high reflectivity and may not absorb light. Other materials may be also used. In some embodiments, the incident surface of the light guide panel 202 may be a plane surface, and the exit surface thereof may be a curved surface, as shown in FIG. 3. Practical situations may be evaluated to configure a desired curvature for the exit surface.

Using optical fiber panel (i.e., fiber panel) as an example of the light guide panel 202, the positional relationship between the light guide panel 202 and the display screen 201 may have different configurations.

Figure 4A:
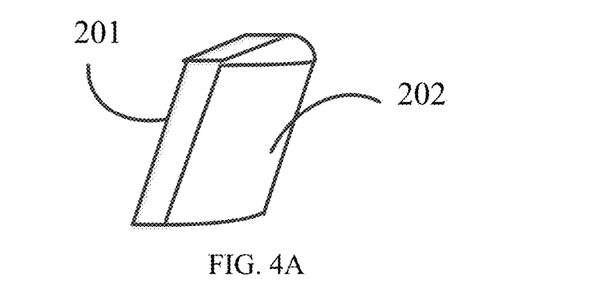
FIG. 4A is a schematic illustration of an exemplary positional relationship between a display screen and a light guide panel consistent with the disclosed embodiments.

In one example, the incident surface of the fiber panel may contact an outer side of the light-emitting surface of the display screen 201.

In another example, the incident surface may be disposed in front of the light-emitting surface of the display screen 201 in a non-contact manner, and the distance between the incident surface of the fiber panel and the light emitting surface of the display screen 201 (e.g., the distance labeled as $d_1$ in FIG. 4B) may be less than a predetermined value.

Figure 4B:
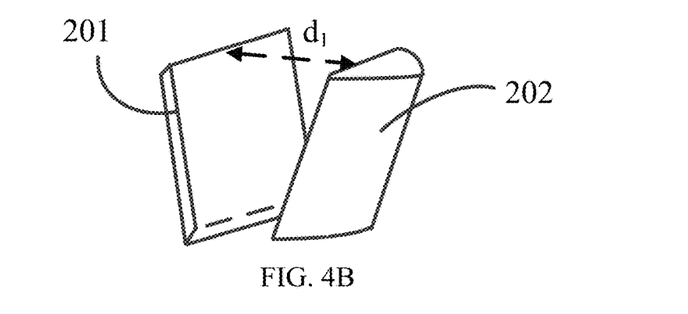
FIG. 4B is a schematic illustration of another exemplary positional relationship between a display screen and a light guide panel consistent with the disclosed embodiments.

In some embodiments, the light incident surface of the optical fiber panel may be adhered to the light emitting surface of the display screen 201 by using a transparent and viscous material, so that the light from the light emitting surface of the display screen 201 is incident on the optical fiber panel as shown in FIG. 4A. Alternatively, the fiber panel and the display screen 201 may be arranged in a non-contact manner. For example, the fiber panel may be disposed at a predetermined distance from the front of the display screen 201. The predetermined distance is smaller than a distance that ensures the light from the light emitting surface of the display screen 201 to reach the fiber panel, such as 5 mm, etc., as shown in FIG. 4B. The distance and relative angle between the light guide panel 202 and the display screen 201 may be determined according to the size of the actual display screen 201 and the light transmittance of the optical fiber panel based on practical needs. The size of the optical fiber panel may be the same, smaller, or greater than the size of the display screen 201, and is not limited in the present disclosure.

Figure 5:
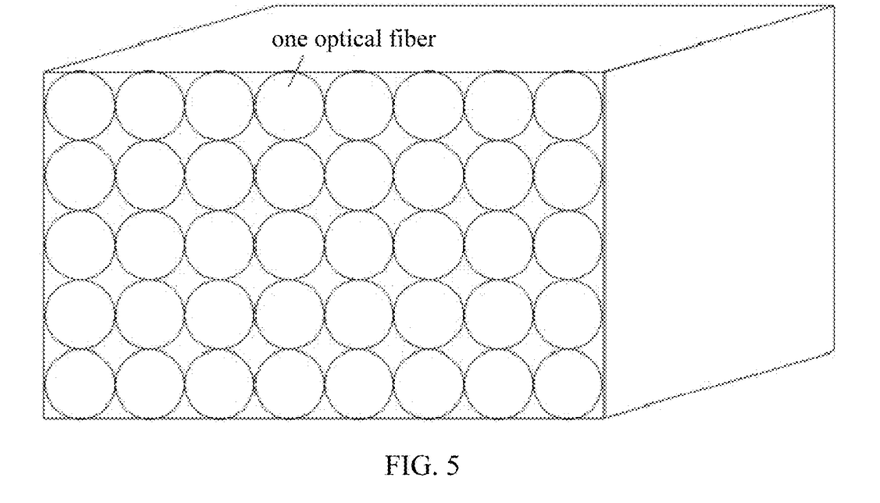
FIG. 5 is an internal structural diagram of an exemplary fiber panel consistent with the disclosed embodiments.

In some embodiments, the optical fiber panel may include an optical fiber array containing at least two optical fibers. A first end of the optical fiber array corresponding to the incident surface may have a plane shape, and a second end of the optical fiber array corresponding to the exit surface have a curved shape. The light emitted from the light emitting surface of the display screen 201 is incident on the incident surface, guided through the optical fiber array, and outputted to leave the exit surface.

FIG. 5 is an internal structural diagram of an exemplary fiber panel consistent with the disclosed embodiments. Each optical fiber in the optical fiber panel may have a uniform thickness, and a plurality of optical fibers may form an array in the optical fiber panel. Further, one end of the plurality of optical fibers (i.e., optical fiber array) is cut into a plane as an incident surface of the optical fiber panel, while the other end of the fibers is cut to form a curved surface as the exit surface of the optical fiber panel.

Alternatively, optical fibers having uneven thickness may be used to form the fiber array in the optical fiber panel. For example, cross-sections of the optical fibers at the end of the incident surface may have smaller size, and cross-sections of the optical fibers at the end of the exit surface may have greater size.

In an exemplary embodiment, a lens of the lens group 203 may have a similar shape or a different shape as the exit surface. A lens may include a curved surface having a greater area than the exit surface of the light guide panel.

In some embodiments, a lens in the lens group 203 may be made of a plastic material or other light-permeable materials. Plastic material may be chosen to produce the lens group 203, and the weight and manufacturing cost of the electronic device may be reduced. A lens in the lens group 203 may have a curved surface, such as a free curved surface, a cylindrical surface, etc. The curved surface of a lens may have the same or different curvature from the optical fiber panel (e.g., curvature of the exit surface). Practical use situations may be evaluated to select the lens with desired curvature. Further, the area of the lens in the lens group 203 may be slightly greater than the area of the fiber panel, such that the light left the fiber panel can be substantially completely incident on the lens group 203. In one embodiment, the lens group 203 may include at least two lenses, the at least two lenses being arranged on a base to form an integral structure. In another embodiment, the lens group 203 may include just one lens which can cover the line of sight of the user's both eyes. The quantity of lenses in the lens group 203 is not limited herein.

Semi-reflective film may be plated/coated on a surface of a lens in the lens group 203 at the inner side closer to the eye. Accordingly, a portion of the light emitted from the optical fiber panel passes through the lens, and the other portion is reflected to be incident on the user's eye, so that the user can see the contents presented by the display screen 201. In the meantime, the semi-reflective characteristics of the lens may allow the user to directly see through the lens and perceive the immediate real environment.

In an exemplary embodiment, if a user is looking forward (e.g., head up without looking away from usual viewpoint), an angle between a horizontal reference plane of the user (e.g., a plane at eyelevel) and a line connecting a center of a lens in the lens group and a center point of the corresponding eye (e.g., the angle labeled as $\alpha$ in FIG. 6) may be less than a preset angle threshold value, enabling the user to view the contents displayed by the display unit in a suitable posture. The distance between an upper edge of a lens in the lens group and the light guide panel (e.g., the distance labeled as $d_2$ in FIG. 6) may be greater than a preset distance. The lens group may be disposed in a preset region at a lower front or an upper front of the optical transmission panel. The preset region at the lower front or the upper front may be included in a space passed through by the light emergent from the light guide panel.

Figure 6:
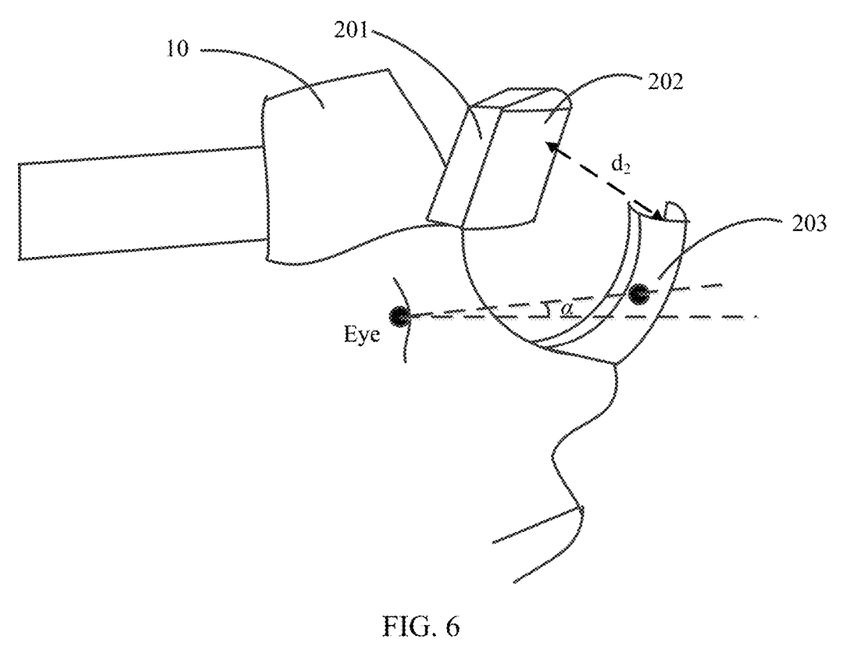
FIG. 6 is a schematic illustration of an exemplary positional relationship between a lens and an eye of a user consistent with the disclosed embodiments.
Figure 7A:
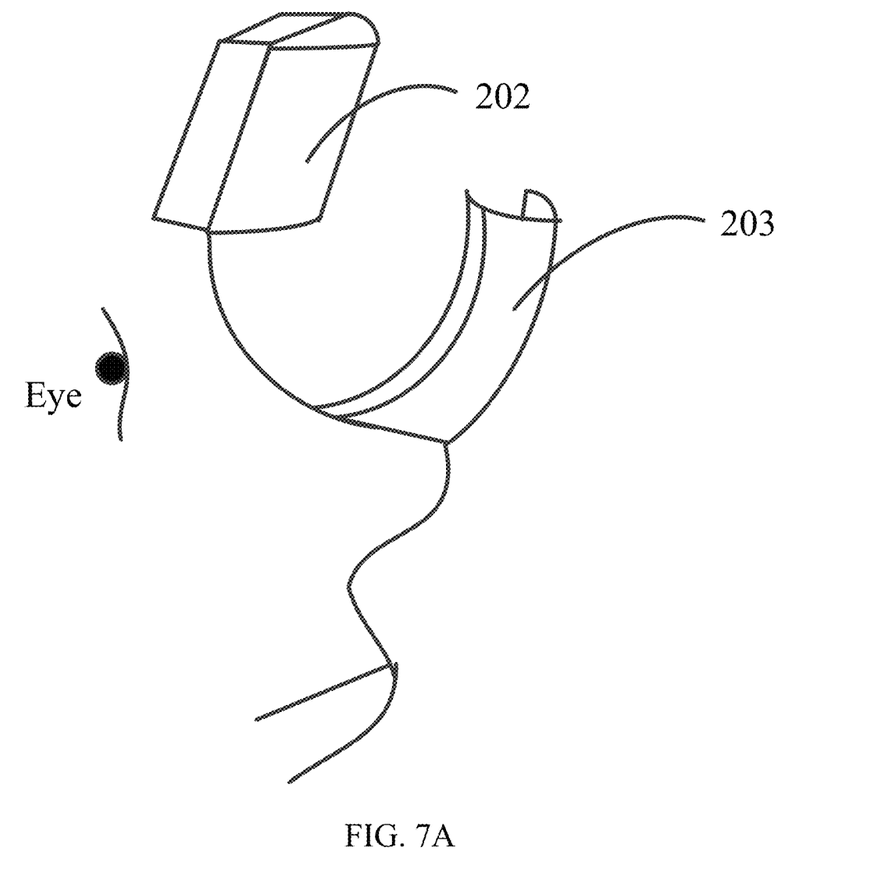
FIG. 7A is a schematic illustration of an exemplary positional relationship between a lens and a light guide panel consistent with the disclosed embodiments.
Figure 7B:
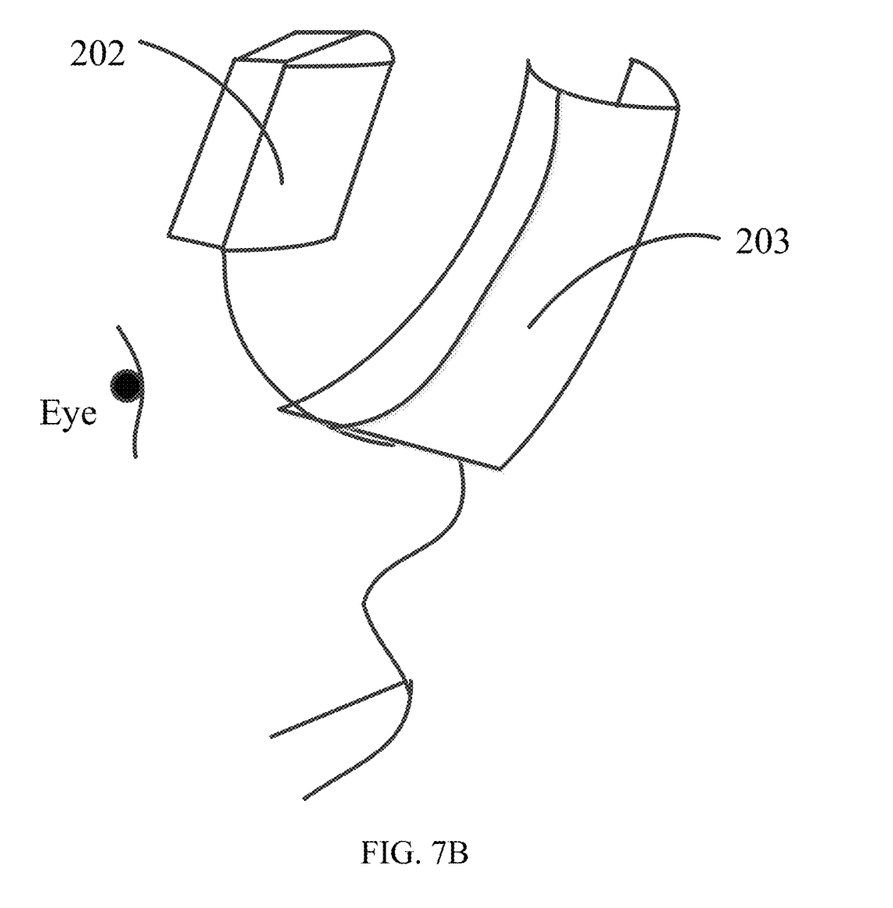
FIG. 7B is a schematic illustration of another exemplary positional relationship between a lens and a light guide panel consistent with the disclosed embodiments.

Referring to FIG. 6, using a lens corresponding to a left eye of the user as an example, the lens may be placed straight ahead (i.e., right in front) of the left eye or at an upper front of the left eye. Specifically, an angle between the horizontal plane and a line connecting the center of the lens and the center of the left eye may be smaller than a preset angle, such as 30°. If the lens is placed straight ahead of the left eye, such angle is 0°. Further, a lens in the lens group 203 may not be on a same vertical plane as the fiber panel. If the lens and the optical fiber panel is too close, a small portion of the light emergent from the fiber panel can be incident on the lens. Thus, a predetermined distance may be reserved between the upper edge of the lens and the optical fiber panel, for further ensuring as much light from the fiber panel to be incident on the lens as possible. The predetermined distance may be, for example, 1 cm or 1.5 cm. In some embodiments, the upper edge of the lens may be lower the upper edge of the optical fiber panel, as shown in FIG. 7A. In some embodiments, the upper edge of the lens may be higher the upper edge of the optical fiber panel, as shown in FIG. 7B.

In some embodiments, the lens group 203 may include a left lens corresponding to a left eye and a right lens corresponding to a right eye. The transmitted light may be incident on the semi-reflective film of the left lens and the right lens, and reflected to the eyes so that the user may see the displayed contents, such as images or videos presented by the display unit.

In some embodiments, the to-be-displayed content may be three-dimensional (3D) content including a first content for the left eye (e.g., a left image) and a second content for the right eye (e.g., a right image). The transmitted light may include a first transmitted light corresponding to the first content, and a second transmitted light corresponding to the second content. The first transmitted light is incident on the semi-reflective film of the left lens, and the second transmitted light is incident on the semi-reflective film of the right lens. Accordingly, the user can see a 3D image of the 3D content.

Further, if displaying 3D content, the display screen 201 may be divided to two regions: a left region for the left eye and a right region for the right eye. The display screen 201 may display the first content at the left region and display the second content at the right region. After traveling through the fiber panel and being respectively reflected by the left lens and the right lens, the first content is incident on the left eye of the user, and the second content is incident on the right eye of the user. By then, the user may perceive the 3D content based on the first content and the second content seen by the eyes.

In some embodiments, the electronic device may include one display screen 201, one light guide panel 202, and one larger lens. In this case, a spacer may be disposed in the middle of the lens to separate incident lights aimed for the left eye from that for the right eye. Correspondingly, the display unit may present an integrated image that stitches the left image for the left eye and the right image for the right eye. Through the transmission in the light guide panel 202, lights corresponded to the images are respectively reflected to the left eye and the right eye so that the user may see a 3D image.

According to various embodiments, the disclosed electronic device may utilize a fixation structure to connect with a device body, and attach the electronic device on the user's head. The device body may include a display screen, a light guide panel disposed in front of the display screen, and a lens group disposed in front of the light guide panel, the transmittance of the lens group may be greater than a preset threshold.

A user may wear the electronic device on the head using the fixation structure, and the device body is maintained at a preset positional relationship with an eye (or both eyes) of the user. As the display screen displays certain content, an incident light emitted from the light-emitting surface of the display screen 201 may enter the incident surface of the light guide panel, and leave the exit surface of the light guide panel corresponding to the incident surface. The light may be further transmitted to reach the inner-side surface of the lens group, and through the reflection on the inner-side surface, at least a part of the transmitted light may enter the eye of the user. Accordingly, the displayed content become visible to the user.

By disposing the light guide panel in front of the display screen, the light emitted from the display screen is transmitted through the light guide panel, an image face resembling a shape of the exit surface is generated on the exit surface of the light guide panel. In the case that the exit surface is curved, a curved image face is generated on the exit surface, thereby changing the exit position of the light relative to the display screen, increasing the exit angle and expanding the viewing angle of the electronic device.

Further, the electronic device is simply structured with the display unit, the light guide panel, and the lens group, without configuring a prism or a glass used in the prior art, thereby greatly reducing an overall size of the electronic device. Accordingly, the disclosed electronic device effectively addresses the technical problems of small viewing angles and relatively large sizes for electronic devices in the prior art, and achieves increased viewing angle and reduced size of the entire device.

Embodiment 2

Figure 8:
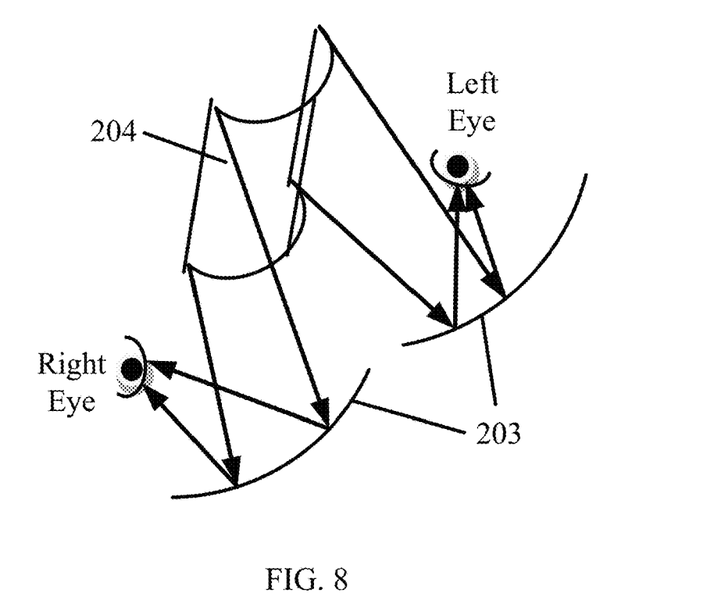
FIG. 8 is a structural diagram of a device body in an exemplary electronic device consistent with the disclosed embodiments.
Figure 9:
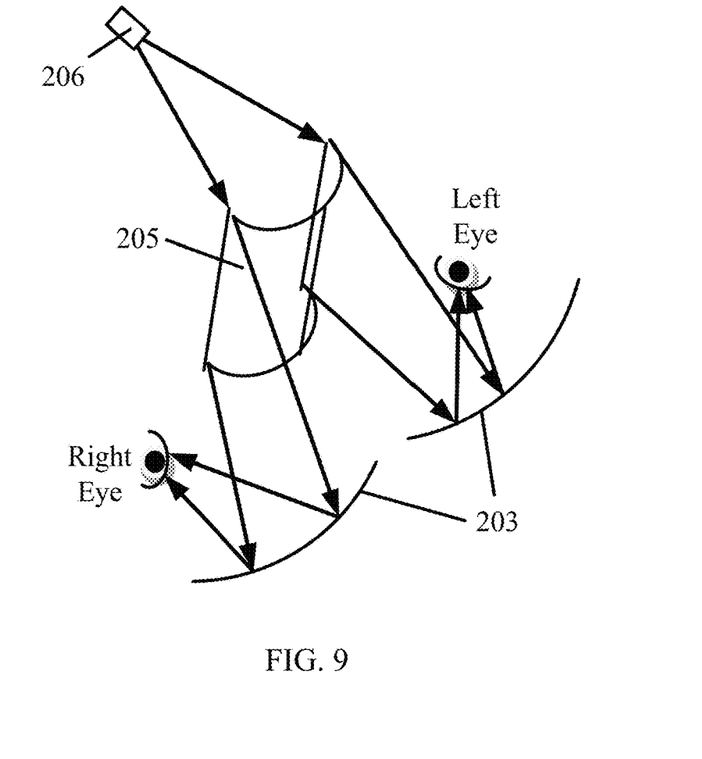
FIG. 9 is a structural diagram of a device body in another exemplary electronic device consistent with the disclosed embodiments.

Referring to FIGS. 8-10, the present disclosure provides another exemplary electronic device. The electronic device includes a fixation structure 10 (e.g., as shown in FIG. 1 and FIG. 6) and a device body 20. The device body 20 is connected to the fixation structure 10, and maintains a preset positional relationship with an eye of a user by using the fixation structure 10. The device body 20 may include a display unit and a lens group 203. In one embodiment, the display unit may be a curved display screen 204 (e.g., as shown in FIG. 8). In another embodiment, the display unit may include a curved projection screen 205 and a projector 206 coupled with the curved projection screen 205 (e.g., as shown in FIG. 9). The display unit includes an exit surface that emits light, the exit surface is facing the lens group 203 so that the emitted light may reach the lens group 203. The lens group 203 includes an inner side surface facing the display unit, the inner side surface reflecting the light emitted by the exit surface to a user's eye, so that contents displayed by the display unit is visible to the user. In some embodiments, the exit surface of the display unit is convex towards the lens group 203, and the inner side surface of the lens group is concave.

Comparing to the first strategy in the prior art, the disclosed electronic device can expand the angle of light emitted by the display unit and increase the angle of view. Further, the display unit and the lens group 203 of the disclosed electronic device require little space, thus addressing the problem of excessive device size of the second strategy in the prior art. In other words, the disclosed electronic devices not only have increased angle of view, but also have reduced size and weight.

Further, as the exit surface of the display unit is convex towards the lens group and the inner side surface of the lens group 203 is concave, the display unit and the lens group fits and compliments each other, reducing image disparity problem. Accordingly, the quality of edges in an image observed by the user may be improved, and larger field of view may be achieved for the disclosed electronic device, thereby meeting user requirements for a large field of view.

Further, the disclosed electronic device has a simple structure, is easy to manufacture, and requires low production costs.

In an exemplary embodiment, the exit surface and the inner side surface may be a smooth curved surface respectively. Based on the compatible shapes of the exit surface and the inner side surface, configurations about the smooth curved surfaces may further improve the edge quality of displayed images.

A type of the exit surface may be chosen according to user requirements about the field of view. In one example, the exit surface may be a cylindrical surface. In another example, the exit surface may be flat at the center and bending at the edges. In another example, the exit surface may be a spherical surface or have a shape like a spherical surface, i.e., a surface convex toward the inner side surface (the distances gradually increases between points of the exit surface and corresponding points in the inner side surface from surrounding positions at the perimeter to center positions in the middle.

In some embodiments, the exit surface may be a circular cylindrical surface.

The inner side surface may have a smooth arc if being cut in any direction. The smooth arc may be an arc segment with two endpoints, or a smooth arc ring. Accordingly, as the inner side surface is formed by smooth arcs, the image edge quality may be improved along the circumference, which allows greater field of view for the electronic device, and satisfies user requirements for large field of view.

Further, the positional relationship between the inner side surface and the exit surface may meet the following condition: the optical paths of lights emitted from every point on the exit surface and reflected by the inner side surface to reach the human eye are the same (or substantially the same). In this way, users can see the corresponding image clearly. In some embodiments, the image provided for the exit surface may be preprocessed for distortion pretreatment. As such, after the lights emitted from every point on the exit surface are reflected by the inner side surface to the human eye, under the combined effects of the distortion pretreatment and optical path differences among the points, the user may clearly perceive the intended image before distortion pretreatment.

In some embodiments, the inner side surface may be represented by the following formula.

$$z = \frac{cr^2}{1 + \sqrt{1 - (1+k)c^2 r^2}} + \sum_{i=1}^{N} A_i E_i(x, y)$$

where c, k, A, and r are coefficients, and r denotes a curvature of a point (x, y, z) on the inner side surface.

In some embodiments, the formula may be simplified by evaluating only those points whose X coordinate has even term subscript, and setting other terms as 0. For example, when coefficients c, r, k, $A_1 x_1 y_0$, $A_2 x_0 y_1$, $A_3 x_2 y_1$, $A_3 x_2 y_1$, $A_4 x_1 y_1$, $A_5 x_0 y_2$, $A_6 x_3 y_0$, $A_7 x_2 y_1$, $A_8 x_1 y_2$, $A_9 x_0 y_3$, are inputted, the coefficients corresponding to terms whose x has an even subscript can affect the outcome, coefficients Ai are set to 0 if i is an odd number. In some embodiments, some term of some coordinate in the above formula, or every term of every coordinate in the above formula may be used to configure the inner side surface.

Coefficients c, r, k, A are related to shape, size, distance between the exit surface and the inner side surface, and positional relationship between the exit surface and the inner side surface. When conditions are determined, coefficients may be obtained by multiple optimization calculations.

The inner side surface may be a spherical sphere or have a similar shape as a spherical sphere. In other words, inner side surface may become gradually further away from the display unit from circumference to center.

The inner side surface may be a cylindrical surface, or have a flat center and curved edges. The specific shape of the inner side surface is not limited herein.

The display unit may be positioned higher than the lens group 203, so that the display unit do not block the user's sight, and the user can observe the entire inner side surface, thereby fully receiving the image reflected by the inner side surface. During operation, the user may face the inner side surface, and the display unit may be positioned higher than user's eyelevel. The display unit being higher than the lens group 203, as used herein, may refer to a lowest point of the display unit being higher than a lowest point of the inner side surface. In some embodiments, the lowest point of the display unit may be higher than the highest point of the inner side surface. Further, in the embodiment where the exit surface is a cylindrical surface, the normal direction of the exit surface may be vertical, titled to the left or right direction of the user, or tilted to the front or rear direction of the user. In other embodiments where the exit surface has other shapes, the normal direction may follow different angles or directions, which is not limited herein.

The display unit may be a curved display screen 204, to fit and compliment the inner side surface of the lens group 203. Accordingly, the exit surface of the display unit may be the light-emitting surface of the curved display screen 204. The curved display screen 204 may have a non-deformable curved surface screen, or a flexible screen capable of being bent and deformed. The flexible screen may be in a bent status when in use.

In some embodiments, the display unit may include a curved projection screen 205 and a projector 206 coupled with the curved projection screen 205. Correspondingly, the exit surface of the display unit that emits light is the curved projection screen 205. According to the practical applications of the electronic device, the projector 206 may be a miniature projector.

Figure 11:
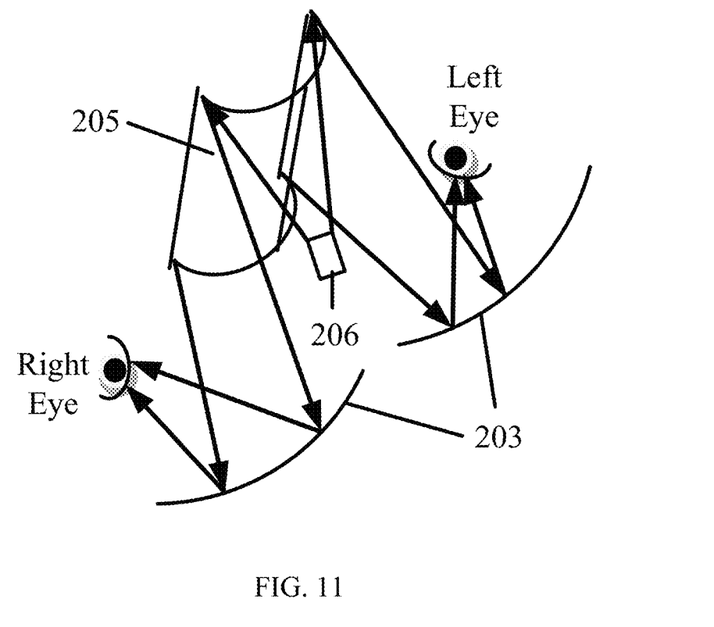
FIG. 11 is a structural diagram of a device body in another exemplary electronic device consistent with the disclosed embodiments.

Specifically, the projector 206 may be a rear projection projector, and accordingly, the projector 206 is disposed on the side of the curved projection screen 205 away from the lens group 203, as shown in FIG. 9. In operation, the projector 206 may project an image to the curved projection screen 205 opposite to the exit surface, and the exit surface of the curved projection screen 205 displays the image. Alternatively, the projector 206 may be a front projection projector, and accordingly, the projector 206 is disposed on the other side of the curved projection screen 205 facing toward the lens group 203, as shown in FIG. 11. During operation, the projector 206 may project an image onto the curved screen, the image is reflected by the exit surface to the inner side surface of the lens group 203, and further reflected by the inner side surface to enter the user's eye.

Since the user receives the image when facing the inner side surface of the lens group 203, the projector 206 may be set at a higher position than the lens group 203 to prevent obstruction of the image reflected from the inner side surface. Specifically, the lowest point of the projector 206 is higher than the highest point of the inner side surface.

In a practical application, both the display unit and the lens group 203 may be disposed at suitable positions on the fixed structure according to actual needs and their respective own structure. The electronic device may further include a supporting structure (e.g., a holder, a bracket) to improve the assembling accuracy. The display unit and the lens group 203 may be mounted to the supporting structure, and the supporting structure may be installed on the fixation structure. Users may hand-hold or wear the electronic device for use or carry.

In the disclosed electronic device, the inner side surface of the lens group 203 reflects the image displayed on the exit surface into the user's eye so that the user obtains the virtual image while a light transmission function of the lens group 203 enables the user to see an actual scene. Thus, the user perceives an overlapping view of the virtual image and the actual scene.

Figure 10:
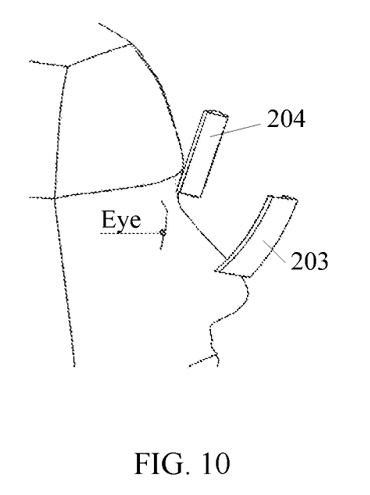
FIG. 10 is a schematic illustration of the device body shown in FIG. 8 maintaining a preset positional relationship with an eye of a user through a fixation structure consistent with the disclosed embodiments.

In the disclosed electronic device, a first position may refer to a position of the user's eye when the device body 20 maintains the preset positional relationship with the user's eye through the fixation structure 10. The display unit is located above the first position, and the lens group 203 is located in front of the first position.

In one embodiment, the device body 20 may include one display unit, and the lens group may include two lenses. The two lenses may be respectively located in front of two first positions. The two first positions refer to, a position of the user's left eye and a position of the user's right eye when the device body 20 maintains the preset positional relationship with the user's eyes through the fixation structure 10.

In this embodiment, the display unit may implement split-screen display to accommodate the needs of separately receiving images by the two eyes. The display screen of the display unit may be split in two parts. The inner side surface of the first lens may reflect the image displayed by the first split screen to one eye of the user, and the inner side surface of the second lens may reflect the image displayed by the second split screen to the other eye of the user. The images shown by the two split screens may be different virtual images of a same scene generated from different angles. The two eyes may receive the virtual images of the same scene, and the user may accordingly perceive a stereoscopic virtual image. In this way, the viewing experience of the user is enriched.

In this case, contents at the center of the screen may be difficult to reach the two lenses. In another embodiment, the device body 20 may include one display unit and one lens. Accordingly, the first position may refer to a position of the user's eye when the device body 20 maintains the preset positional relationship with the user's eye through the fixation structure 10. In this embodiment, one set of the device body 20 (e.g., including one pair of the display unit and the lens) may be provided. That is, only one eye of the user obtains the overlapping view of the virtual scene and the reality scene. Alternatively, two sets of the device bodies 20 may be provided. That is, both eyes of the users may obtain the overlapping views through the two sets of the device bodies. Further, the display units of the two device bodies 20 may be used to display virtual images of a same scene at different angles, such that the user may perceive overlapping view of a 3D virtual scene and the reality scene.

It can be understood that, the quantity of the display units or the lenses in the lens group of the device body 20, or their corresponding relationships are not limited to the embodiments described herein. One or more display units may be set up; and one or more lenses of the lens group may be used. Each display unit may emit light to one or more inner side surfaces of the one or more lenses. The inner side surface of each lens may reflect the displayed image to the user's eye(s). The exit surface of the display unit may be convex toward all corresponding lenses. The inner side surface of the lens may be concave correspondingly with the related display units. The display unit(s) as a whole and the lens(es) as a whole may be arranged with same parameters and at same locations as described in previous embodiments having a single display unit and a single lens.

Specifically, in an electronic device whose lens group 203 include two or more lenses, the lenses may be arranged to be connected by a connecting element. The connecting element and the lenses may form an integral structure. The connecting element may be transparent.

While the preferred embodiments of the present invention have been described, those skilled in the art will be able to make further changes and modifications to these embodiments, once the basic concept of creativity is known. Accordingly, the appended claims are intended to be construed as including the preferred embodiments and all changes and modifications that fall within the scope of the invention.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An electronic device, comprising:
    a device body being maintained at a preset position relative to an eye of a user, wherein the device body comprises:
        a display unit for emitting light corresponding to a display content; and
        a lens group having a side surface facing the display unit,
    wherein:
        the light emitted from the display unit is reflected by the side surface to be incident on the eye of the user; and
        an exit surface of the display unit is convex towards the lens group.

2. The electronic device according to claim 1, wherein the display unit further comprises:
    a display screen for emitting the light; and
    a light guide panel disposed in front of the display screen, an exit surface of the light guide panel being the exit surface of the display unit;
    wherein the light emitted by a light-emitting surface of the display screen is incident on an incident surface of the light guide panel, transmitted through the light guide panel, and emergent from the exit surface of the light guide panel opposite to the incident surface.

3. The electronic device according to claim 2, wherein:
    the incident surface of the light guide panel is a plane; and
    the exit surface of the light guide panel is a smooth curved surface.

4. The electronic device according to claim 3, wherein a lens in the lens group is a curved surface having a greater area than the exit surface of the light guide panel.

5. The electronic device according to claim 4, wherein, if the eye is looking straight ahead, an angle between a horizontal reference plane at an eyelevel of the user and a line connecting a center of the lens and a center of the eye is less than a preset angle value.

6. The electronic device according to claim 5, wherein a distance between an upper edge of the lens in the lens group and the light guide panel is greater than a preset distance.

7. The electronic device according to claim 2, wherein:
the light guide panel is an optical fiber panel;
the optical fiber panel includes an optical fiber array containing at least two optical fibers;
a first end of the optical fiber array corresponding to the incident surface of the light guide panel is a plane; and
a second end of the optical fiber array corresponding to the exit surface of the light guide panel is a curved surface.

8. The electronic device according to claim 2, wherein the incident surface of the light guide panel is attached to the light-emitting surface of the display screen.

9. The electronic device according to claim 2, wherein:
the light guide panel is disposed in front of the display screen without direct contact, and
a distance between the incident surface of the light guide panel and the light-emitting surface of the display screen is less than a preset threshold distance.

10. The electronic device according to claim 1, wherein:
the lens group further comprises a left lens corresponding to a left eye of the user and a right lens corresponding to a right eye of the user, the left lens and the right lens respectively coated with a semi-reflective film at the side surface;
the display content is a three-dimensional content including a left image and a right image of a same scene generated at different angles;
the display unit emits a first light corresponding to the left image and a second light corresponding to the right image; and
the first light emitted from the display unit is reflected by the left lens to be incident on the left eye, and the second light emitted from the display unit is reflected by the right lens to be incident on the right eye.

11. An electronic device comprising:
a device body being maintained at a preset position relative to an eye of a user, wherein the device body comprises:
a display unit for emitting light corresponding to a display content, an exit surface of the display unit being a cylindrical surface; and
a lens group having a side surface facing the display unit;
wherein:
the light emitted from the display unit is reflected by the side surface to be incident on the eye of the user; and
the side surface of the lens group facing the display unit is concave.

12. The electronic device according to claim 1, wherein the display unit is a curved display screen, and a light-emitting surface of the curved display screen is the exit surface of the display unit.

13. The electronic device according to claim 1, wherein the display unit further comprises: a curved projection screen, and a front projection projector coupled to the curved projection screen, the exit surface of the display unit being a surface of the curved projection screen from which the light emitted from the projector is reflected towards the side surface of the lens, which further reflects the reflected light towards the eye of the user.

14. An electronic device, comprising:
a display unit for emitting light corresponding to a display content; and
a lens disposed at a preset distance from the display unit and at a preset position relative to an eye of a user, the lens having a side surface facing the display unit,
wherein:
the light emitted from the display unit is reflected by the side surface of the lens to be incident on the eye of the user; and
an exit surface of the display unit is convex towards the lens.

15. The electronic device according to claim 14, wherein the display unit further comprises:
a display screen for emitting the light; and
a light guide panel disposed in front of the display screen, an exit surface of the light guide panel being the exit surface of the display unit;
wherein the light emitted by a light-emitting surface of the display screen is incident on an incident surface of the light guide panel, transmitted through the light guide panel, and emergent from the exit surface of the light guide panel opposite to the incident surface.

16. The electronic device according to claim 14, wherein the display unit is a curved display screen, and a light-emitting surface of the curved display screen is the exit surface of the display unit.

17. The electronic device according to claim 14, wherein the display unit further comprises: a curved projection screen, and a front projection projector coupled to the curved projection screen, the exit surface of the display unit being a surface of the curved projection screen from which the light emitted from the projector is reflected towards the side surface of the lens, which further reflects the reflected light towards the eye of the user.

* * * * *